United States Patent [19]

Agazzone et al.

[11] 4,275,311
[45] Jun. 23, 1981

[54] CONTROL AND PROTECTION SYSTEM FOR AN INSTALLATION FOR THE COMBINED PRODUCTION OF ELECTRICAL AND THERMAL ENERGY

[75] Inventors: Umberto Agazzone, Novara; Francesco P. Ausiello, Turin, both of Italy

[73] Assignees: Fiat Auto S.p.A., Turin; Ercole Marelli & C. S.p.A., Milan, both of Italy

[21] Appl. No.: 143,685

[22] Filed: Apr. 25, 1980

[30] Foreign Application Priority Data

May 23, 1979 [IT] Italy .................. 68093 A/79

[51] Int. Cl.³ .................. F02N 11/06; H02J 3/04
[52] U.S. Cl. .......................... 290/2; 290/34; 290/35; 307/81; 307/86
[58] Field of Search ............ 60/709; 307/51, 76, 307/86, 81; 290/2, 34, 35; 340/647, 648; 324/158 MG

[56] References Cited

U.S. PATENT DOCUMENTS

| 363,129 | 5/1887 | Easton | 324/158 MG |
|---|---|---|---|
| 2,727,202 | 12/1955 | Lanfers | 318/447 |
| 3,703,663 | 11/1972 | Wagner | 307/86 |
| 3,944,837 | 3/1976 | Meyers et al. | 290/2 |
| 4,164,660 | 8/1979 | Palazzetti | 290/2 |

Primary Examiner—J. V. Truhe
Assistant Examiner—Shelley Wade
Attorney, Agent, or Firm—Sughrue, Rothwell, Mion, Zinn and Macpeak

[57]  ABSTRACT

A power-generating installation comprises a plurality of modular power plants each comprised of an internal combustion engine connected to an electric machine. The electric machine is used to start the engine and thereafter operates as a generator supplying power to an electrical network common to all the modular plants. The installation has a control and protection system comprising a plurality of control modules each associated with a respective plant, and a central unit passing control signals to the modules to control starting and stopping of the individual power plants. Upon the detection of abnormal operation or failure of its associated power plant, each control module transmits an alarm signal back to the central unit which thereupon stops, or prevents the starting, of the corresponding power plant. Parameters monitored by each control module include generated current and inter-winding leakage current of the electric machine.

9 Claims, 3 Drawing Figures

CONTROL AND PROTECTION SYSTEM FOR AN INSTALLATION FOR THE COMBINED PRODUCTION OF ELECTRICAL AND THERMAL ENERGY

The present invention relates to installations for the combined production of electrical energy and heat, and in particular, to control and protection systems incorporated in such installations.

Installations for the combined production of electrical and thermal energy are known which include a plurality of modular power plants each comprising:

(a) a liquid-cooled internal combustion engine;

(b) an asynchronous electric machine drivingly connected to the internal combustion engine and arranged to act as a motor during starting of the internal combustion engine and thereafter as a generator, driven from the engine, for the production of electrical power; and (c) heat recovery means including a first fluid circuit around which a first fluid constituted by the engine coolant liquid is arranged to flow, and a heat exchanger having a primary side connected into said first fluid circuit and a secondary side through which a second fluid is arranged to flow to recover, from the engine coolant liquid, heat energy imparted thereto by the internal combustion engine;

said installation further including a second fluid circuit around which said second fluid is arranged to circulate, the secondary sides of the said power plant heat exchangers being connected into the second fluid circuit in parallel with each other and the electric machines of the power plants being electrically connectable in parallel to a common electrical energy distribution line.

Problems arise in the control of an installation of the above indicated form in the following areas:

adjustment of the energy output of the installation to consumer demand by controlling the number of modular power plants in operation in dependence on the electrical and thermal loads;

the connection in parallel to an electrical line of one or more modular power plants in such manner as to prevent overloading of the line (the current demand of the asynchronous electric machines on starting is extremely high);

the control of the power supplied by each individual modular power plant with the object of preventing the power factor from falling below a certain minimum value, (in order to avoid excessive reactive power input) and of safeguarding the internal combustion engine from failures manifested by a loss of power.

The object of the present invention is to provide in an installation of the aforesaid type a control and protection system capable of enabling the automatic, or operator controlled, connection to or disconnection from an electrical line of one or more modular power plants without causing undue disturbances or overloading of the line itself, the system in addition protecting each modular power plant in the event of mechanical or electrical failures.

Accordingly, the present invention provides a control and protection system for an installation of the aforesaid type wherein the system includes a plurality of control modules each arranged to control a respective one of the said power plants and to output an alarm signal upon the occurrence of any one of a number of alarm conditions corresponding to abnormal or failure of the associated power plant, and a central unit connected to each of said control modules to feed control signals thereto and receive alarm signals therefrom; said central unit including;

control means manually operable to preset for running or to stop a selected one or ones of the modular power plants, said control means being arranged to initiate starting of a said power plant preset for running, by the output of a said control signal to the appropriate control module;

timer and interlock means operative to ensure that the modular power plants which have been previously preset for running are started in a sequential manner;

temperature sensor means arranged to sense for each said power plant the temperature of the second fluid leaving the said heat exchanger thereof;

inhibit means connected both to the temperature sensor means and to receive said alarm signals from the control modules, said inhibit means being operative to prevent the starting, or to stop the operation of a said modular power plant when either the corresponding control module outputs a said alarm signal or the corresponding temperature sensed by said sensor means exceeds a predetermined value; and each control module including;

electrical connector means operative in response to a said control signal output from said control means to interconnect the associated modular power plant and the said common electric energy distribution line whereby to energise the electric machine for operation as a starting motor;

delayed-activation means arranged to activate ignition and fuel feed devices of the internal combustion engine included in the associated power plant, after a predetermined delay relative to the operation of said connector means whereby to permit the electric machine to reach running conditions before the ignition of the internal combustion engine is connected thereto;

first measuring means arranged to measure the current supplied by the electric machine when operating as a generator and to output a warning signal when said supplied current is below a first predetermined current value;

second measuring means arranged to measure the inter-winding leakage current of said electric machine, and to output a warning signal when said leakage current exceeds a second predetermined current value;

an output circuit connected to receive said warning signals from the first measuring means and second measuring means and operative upon receipt of a said warning signal to output to the inhibit means of the central unit a said alarm signal indicative of the alarm condition giving rise to the warning signal; and timer means arranged to prevent the first measuring means from causing the output circuit to output a said alarm signal during a predetermined period of time immediately following operation of said connector means to effect starting of the electric machine.

The control and protection system permits the internal combustion engine of each modular power plant to be operated at an approximately constant and optimum speed (in relation to carburation conditions and efficiency), insofar as it enables adjustment in the power supplied by the installation by controlling the number of power plants connected to the electrical distribution line, as well as by the usual expedient of varying the flow of fuel to change the speed of each engine. Due to the efficient use of fuel by the engines, the installation is very economic to run and pollution is kept to a minimum. Furthermore, at the design stage, the determination of the size of installation needed to satisfy the power requirements of a user is considerably simplified as it is possible to design installations with various output powers simply by arranging in parallel the appropriate number of modular power plants.

The use of identical control modules also gives rise to considerable economies since production can be standardised around the same basic module. The control and protection system offers further advantages such as ease of operation, of installation, and of maintenance.

A power-generating installation incorporating a control and protection system embodying the invention, will now be particularly described, by way of example, with reference to the accompanying drawings, in which.

Figure 1:
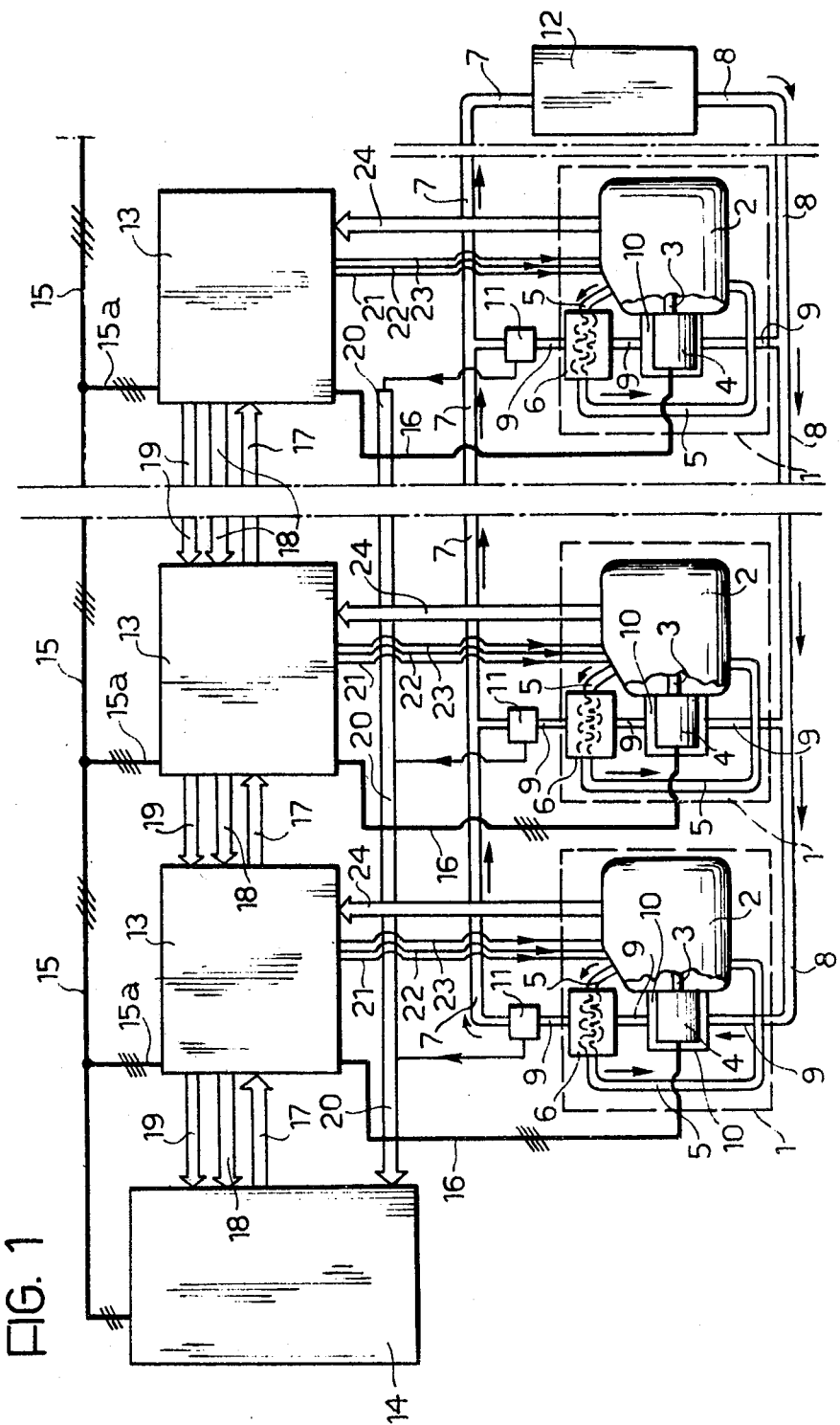
FIG. 1 is a diagrammatic illustration of the overall installation.

The installation shown in FIG. 1 includes a plurality of modular power plants 1 for the combined production of electrical energy and heat, each power plant being of the form described in Italian Patent Application No. 69573-A/76 and in Italian Utility Model Application No. 53376-B/77 made by one of the Applicants.

Each power plant 1 includes an internal combustion engine 2 the output shaft 3 of which is connected to the rotor shaft (not shown) of a three-phase asynchronous electric machine 4. The electric machine 4 is arranged to operate as an electric motor for starting the internal combustion engine 2, and thereafter as a generator for the production of electrical energy.

Each power plant 1 also includes heat recovery means which by means of heat exchangers serves to recover heat from the engine cooling liquid (typically water), from the exhaust gases and from the lubricating oil used in the said engine 2. The heat recovery means includes a fluid circuit 5 through which circulates the engine coolant, and a heat exchanger 6 the primary side of which is connected into the fluid circuit 5. In the heat exchanger 6 the engine coolant flowing through the fluid circuit 5 yields heat to a heat-transfer fluid flowing through the secondary side of the heat exchanger.

The installation further comprises a heat-transfer fluid circuit serving all the power units 1 and around which the heat-transfer fluid is arranged to circulate. The heat-transfer circuit includes a supply pipe 7 and a return pipe 8 between which the secondary sides of the heat exchangers 6 are connected in parallel by branch supply and return pipes 9. The heat-transfer fluid fed back to each power plant 1 through the associated branch return pipe 9 is arranged to flow through a jacket 10 surrounding the corresponding three-phase electric machine 4 on its way to the heat exchanger 6.

A temperature sensor 11 is positioned in each of the branch supply pipes 9 through which the heat-transfer fluid passes on leaving the heat exchangers 6. As will be described in greater detail hereinafter, should any of the sensors 11 indicate that the temperature of the heat-transfer fluid leaving the associated heat exchanger 6 exceeds a predetermined threshold value, then the corresponding internal combustion engine 2 will be stopped or its starting prevented.

The supply pipe 7 and the return pipe 8 are connected to the inlet and to the outlet respectively of a plant 12 arranged to utilise the recovered heat.

The installation is provided with a control and protection system which comprises a plurality of control modules 13 each associated with a respective one of the power plants 1, and a central unit 14. A three-phase electrical power line 15 with a neutral wire is connected to the central unit 14 and control modules 13. Each control module 13 is connected by a respective three-phase line 16 (provided with a neutral wire) to the asynchronous electric machine 4 of the corresponding power plant 1. The control modules 13 are interconnected with the central unit 14 by a control bus 17 transmitting electrical control signals from the unit 14 to the modules 13, and two alarm data buses transmitting data from the modules 13 to the unit 14. In the case of an alarm condition (that is, a plant failure or an abnormal operating condition) occurring at any of the power plants 1, the alarm data bus 18 carries data indentifying the power plant 1 concerned while data bus 19 carries data identifying the nature of the alarm conditions. A further data bus 20 connects the outputs of the temperature sensors 11 to the central unit 14. Signal lines 21, 22 and 23 connect each individual control module 13 to various devices (not shown) associated with the internal combustion engine 2 of the corresponding modular power plant 1, these devices including an electrically operable fuel feed valve, an electronic ignition device and an over-speed sensor arranged to detect excessive shaft rotational speeds of the engine 2. In addition to the over-speed sensor, each internal combustion engine 2 has an associated fuel leakage sensor, the output of these sensors being connected to the corresponding control module 13 by a line 24.

The form and operation of a control module 13 will now be described with reference to FIG. 2.

Figure 2:
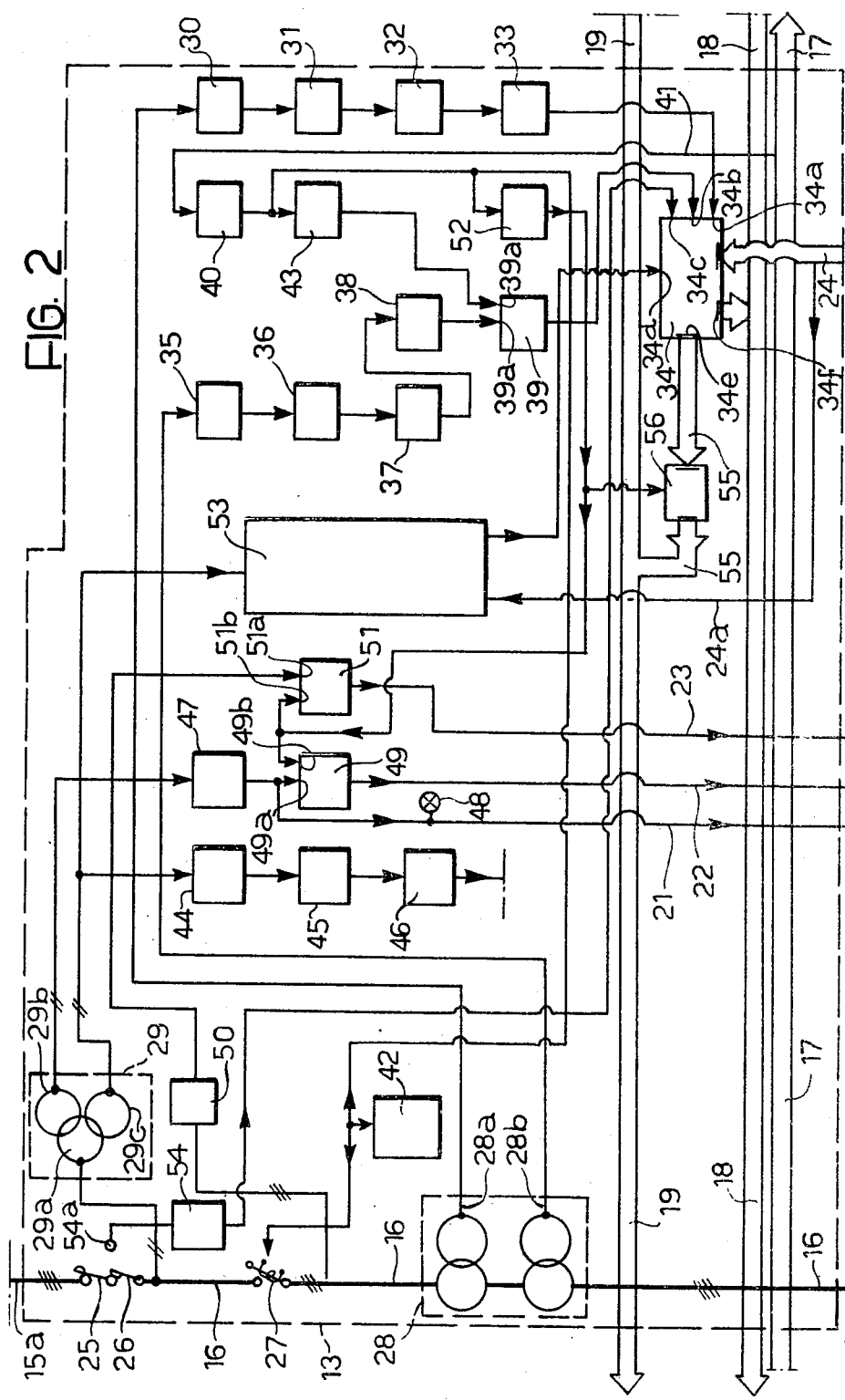
FIG. 2 is a block circuit diagram of a control module of the installation's control and protection system.

Each control module 13 is connected to the electrical power line 14 via a three-phase branch line 15a, as shown in FIGS. 1 and 2. An automatic magnetic trip switch which is resettable from externally of the module 13 is sensitive to current flowing in the line 15a. The purpose of the switch 25 is to protect the lines 15 and 15a from electrical overloads if, for example, a shortcircuit occurs between the windings of the electric machine 4 of the associated power plant 1. To this end, the switch 25 is set to trip out and isolate the machine 4 from the line 15 when current flowing in the line 15a rises above a value which only just exceeds that of the starting current of the electric machine 4. The switch 25 therefore also serves to protect the electric machine 4 should it be connected to the line 15a in anti-phase, (the line current, in this case, as known in the art, having a maximum possible value equal to double that of the starting current).

A thermal cut-out 26 is provided in series with the trip switch 25 to protect the windings of the electric machine 4 against overheating in the case where the internal combustion engine 2 coupled thereto fails to start when turned by the machine 4 acting as a starting motor, or in the case of the machine being overloaded. Also connected in series with the trip switch 25 is a contactor 27 operative to reconnect or disconnect the electric machine 4 to the line 15a in response to a control signal output from the central unit 14 as will be more fully described hereinafter.

A current transducer 28 inserted in the line 16 is arranged to supply to a first output 28a thereof an electrical signal proportional to the leakage current which may flow between the windings of the electric machine 4 during its operation due to a deterioration of the inter-winding insulation. The transducer 28 is further arranged to supply to a second output 28b an electrical signal proportional to the current in the line 16 during operation.

A single-phase transformer 29 has a primary winding 29a shunt connected to the electrical line 16 at a point immediately adjacent the electrical machine side of the thermal cut-out 26. The transformer 29 has two secondary windings shown respectively as 29b and 29c.

The output 28a of the current transducer 28 is connected to the input of a rectifier 30 (for example, of the diode bridge type) which serves to rectify the signal proportional to the inter-winding leakage current of the electric machine 4. The output of the rectifier 20 is connected to the input of a filter 31 to smooth the signal rectified by the rectifier 30. The rectified and smoothed signal output from the filter 31 is fed to the input of a threshold comparator 32 which compares this signal with a predetermined reference. The threshold comparator 32 outputs a warning signal to the input of an amplifier 33, whenever the signal supplied thereto from the filter 31 exceeds the reference value. The amplifier 33 amplifies this warning signal and feeds it to a first input 34a of a coder circuit 34. The coder circuit 34 (which, for example, is of the binary-coded-decimal coding matrix type) transforms the warning signal received into a binary signal for transmission to the central unit 14 in a manner to be more fully described below.

The output 28b of the current transducer is connected to the input of a rectifier 35 (for example, of the diode bridge type). This rectifier 35 serves to rectify the signal supplied thereto from the current transducer 28, this signal being indicative of the current supplied during operation by the electric machine 4. The output from the rectifier 35 is smoothed by a filter 36 and the resultant rectified and smoothed signal is fed to the input of a threshold comparator 37 which compares this signal with an internal reference value. When the signal fed to the comparator 37 is less than the reference value, the threshold comparator 27 outputs a warning signal to the input of an amplifier 38. The amplifier 38 amplifies this signal and feeds it to a first input of an electronic circuit 39 having a "logical product" or AND function.

The control bus 17 feeding control signals from the central unit 14 to the modules 13 comprises a plurality of individual lines each associated with a respective one of the modules 13. Each such line is connected to an amplifier 40 of its associated module 13 by an input line 41. The control signals carried by each line of the bus 17 control the operation of the contactor 27 of its associated control module 13 and thus the starting of the corresponding power plant 1. Each line of the bus 17 is connected to an amplifier 40 of its associated module 13 by an input line 41.

The output signal from the amplifier 40 is fed to the excitation winding of the contactor 27 thereby permitting energisation of the associated electric machine 4 via the electrical line 16 to start up the corresponding power plant 1. The output signal from the ammplifier 40 is also fed to an hour-meter device 42 which measures the operating time of the power plant 1 controlled by the control module 13. The hour-meter device 42 is respectively started and stopped every time the contactor 27 is closed and opened.

Simultaneously with being fed to the contactor 27 and hour-meter device 42, the output signal from the amplifier 40 is applied to the input of a timer device 43 which, after a predetermined time delay, feeds the said signal to a second input 39b of the electronic circuit 39. As already mentioned above, the electronic circuit 39 effects a "logical product" function in the sense that it only enables the transmission of a signal received at its input 39a to the coder circuit 34 when a signal is simultaneously present at its input 39b.

As described above, the signal leaving the filter 36 is indicative of the current supplied during operation by the asynchronous machine 4. This signal is therefore also a measure of the electrical power supplied by modular power plant 1. When the level of said supplied power falls below a minimum value, the threshold comparator 37 sends a warning signal via the amplifier 38 to the input 39a of the electronic circuit 39. The electronic circuit 39 will transmit this warning signal to a second input 34b of the coder circuit 34 whenever a signal from the timer 43 is present at the input 39b of the circuit 39; upon receipt of this signal the coder circuit 34 is arranged to transmit to the central unit 14 a coded alarm signal, as will be described hereinafter. The purpose of the timer 43 is to prevent the circuit 39 from feeding a warning signal to the coder circuit 34 during the starting phase of the power plant 1, since in this phase the power supplied by the electric machine 4 will be below the reference threshold of the comparator 37.

During running-in of the modular power plant 1, the electrical power supplied may be less than the reference threshold of the comparator 37 and it is advisable during the running-in period to connect the output of the timer 43 to earth (via, for example, a removable bridge, not shown) in order to ensure that no signals pass through the electronic circuit 39 from the threshold comparator 37 to the coder circuit 34.

The secondary winding 29c of the single-phase transformer 29 supplies a power supply unit of the module 13. This power supply unit comprises a rectifier 44, for example, of the diode bridge type, whose input is connected to the secondary winding 29c. The output of the rectifier 44 is connected via a smoothing filter 45 to the input of a voltage stabiliser circuit 46, of known type. The stabiliser circuit 46 is arranged to output a stabilised continuous voltage to energise the threshold comparators 32 and 37, the amplifiers 33, 38 and 40, the "logical product" electronic circuit 39, the timer 43 and other electronic circuits included in the control module 13 which require for their operation a continuous, stabilised d.c. voltage.

The other secondary winding 29b of the single-phase transformer 29 is connected to the input of a rectifier 47, for example, of the diode bridge type. The rectifier 47 outputs a d.c. voltage via the line 21 to the overspeed sensor (of known type and not illustrated) associated with the shaft 3 of the internal combustion engine 2. A lamp 48 is connected to the line 21 to provide an indication of the presence of a voltage on that line. The output of the rectifier 47 is also fed to one input 49a of an electronic circuit 49 which effects a "logical product" function. This circuit 49 is arranged to energise, via the line 22, the fuel feed electrovalve (not shown).

A three-phase rectifier 50 is connected on its a.c. input side to the electrical line 16 at a point immediately adjacent the electrical-machine side of the contractor 27. The three-phase rectifier 50 outputs a d.c. voltage to an input 51a of an electronic circuit 51 which effects a "logical product" function. During operation of the power plant 1 this d.c. voltage is fed via the electronic circuit 51 and the line 23 to an electronic ignition device (of known type and not illustrated) of the internal combustion engine 2.

The output of the amplifier 40, in addition to being connected to the timer 43, is also connected to a timer circuit 52. The timer circuit 52 delays for a predetermined time the transmission of the control signal from the amplifier 40 to the inputs 49b and 51b respectively of the circuits 49 and 51, the purpose of the delay being to prevent the activation of the electronic ignition device and the opening of the fuel feed electrovalve (whereby to prevent the starting of the internal combustion engine 2) before the electric machine 4 operating as a starting motor, has had time to reach suitable running conditions. The circuits 49 and 51 which as already mentioned effect "logical product" functions, inhibit the transmission of the signals present at their respective inputs 49a and 51a until the timer circuit 52 has sent an enabling signal to the inputs 49b and 51b.

As already mentioned, a sensor (not shown) of known type is provided to detect fuel leaks from the internal combustion engine 2. The output signal from this sensor is fed to an electronic circuit 53 via the line 24 and a line 24a. The electronic circuit 53 processes this output signal and, when a fuel leak is indicated, outputs a warning signal to an input 34d of the coder circuit 34. As a result, the coder circuit 34 transmits a coded alarm signal to the central unit 14, as will be more fully described hereinafter.

A circuit 54 associated with the trip switch 25 is arranged to output a warning signal to an input 34c of the coder circuit 34 when the switch 25 trips as a result of thermal or current overload. To this end, tripping of the switch 25 is arranged to move the switch arm into contact with an adjacent terminal 54a of the circuit 54. On receipt of a warning signal from the circuit 54, the coder circuit 34 sends a corresponding coded alarm signal to the central unit 14, as will be described below.

As already mentioned, the coder circuit 34 in response to warning signals fed thereto, is arranged to output a number of different alarm signals corresponding to different alarm conditions (that is, abnormal operating conditions or to failure of the modular power plant 1). The relevant alarm conditions are substantially as follows:

(a) an increase in the leakage current between the windings of electric machine 4 due to deterioration of the inter-winding insulation, this increase being indicated by a signal output from the threshold comparator 32 via the amplifier 33 to the input 34a of the coder circuit 34;

(b) a reduction in the electrical power supplied by electric machine 4 either as a result of the power factor falling below a minimum value determined by the acceptable level of reactive power which the electrical power line 15 can absorb, or as a result of a failure in the internal combustion engine 2 which manifests itself in a fall off of the electrical power supplied by the electric machine 4; this second abnormal operation condition being indicated by a signal fed to the input 34b of the coder circuit 34 from the threshold comparator 37 via the amplifier 38;

(c) a thermal or current overload on the electrical power line 15a owing, for example, to a shortcircuit between the windings of the electric machine 4, or to the connection of the electric machine 4 to the electrical power line 15 in anti-phase; these abnormal operating conditions being indicated by a signal fed to the input 34c of the coder circuit 34;

(d) a fuel leak from the internal combustion engine 2, indicated by a signal fed to the input 34d of the coder circuit 34;

(e) an increase beyond a predetermined limit of the rotational speed of the shaft 3 of the internal combustion engine 2, this signal being indicated to the coder circuit 34 by means of a signal transmitted by said overspeed sensor via the line 24.

Different coded alarm signals are stored in the coder circuit 34, each corresponding to a particular alarm condition (failure state or abnormal operating condition). When the coder circuit 34 receives a warning signal at one if its inputs, the circuit 34 outputs coded signals at an output 34e to indicate the nature of the alarm condition experienced. These signals pass via a connecting bus 55 to the alarm data bus 19 and then onto the central unit 14. Interposed in the bus 55 is an electronic circuit 56 which effects a "logical product" function. The purpose of the circuit 56 is to allow the passage of alarm signals to the bus 19 only in the presence of an enabling signal fed to the circuit 56 from the timer circuit 52.

The coder circuit 34, as well as outputting alarm signals indicating the nature of the alarm condition, is arranged to simultaneously generate at an output 34f coded identification signals to enable the central unit 14 to identify which particular control module 13 is transmitting the alarm signals. The identification signals are fed from the output 34f of the coder circuit 34 to the central unit 14 over the alarm data bus 18.

Figure 3:
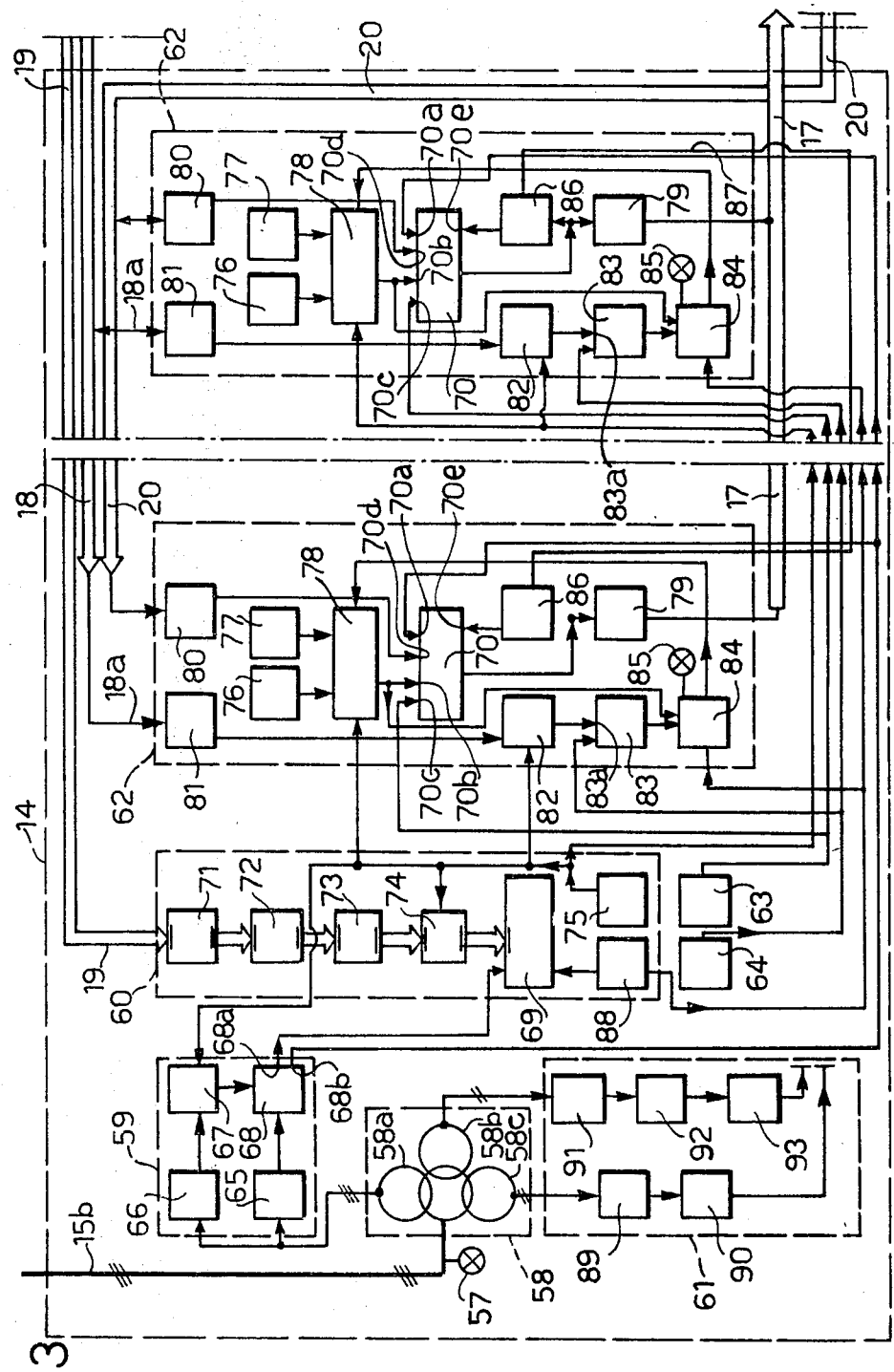
FIG. 3 is a block circuit diagram of a central unit of the control and protection system.

The central unit 14 will now be described in detail with particular reference to FIG. 3.

The central unit 14 is connected to the electrical power line 15 via a three-phase line 15b. A lamp 57 is connected to the line 15b to indicate the presence of a voltage on this line. The line 15b is connected to a three-phase transformer 58 provided with a three-phase secondary winding set 58a and two single-phase secondary windings 58b and 58c respectively. The winding set 58a is connected to a circuit 59 for monitoring the electrical parameters of the line 15b, and hence of the electrical line 15.

The unit 14 includes a circuit block 60 for the decoding, storing and visual display both of the alarm signals received via the bus 19 from the coder circuits 34 of the various control modules 13, and of alarm signals generated by the monitor circuit 59 in response to dangerous variations in the electrical parameters of the lines 15, 15b.

The unit 14 further includes power supply circuitry 61 which, as will be more fully explained hereinafter, is arranged to rectify, smooth and stabilise the single-phase a.c. outputs from the secondary windings 58b and 58c in order to generate the various d.c. voltages (stabilised and unstabilised) necessary for the proper operation of all the active electronic circuits included in the central unit 14.

The central unit 14 is provided with a plurality of control circuits 62, each of which is arranged to control the starting and stopping of a corresponding modular plant 1 by means of control signals fed to the plant 1 via the corresponding control module 13. For ease of illustration, in FIG. 3 only the first and last of said control circuits 62 have been shown.

The central unit is also provided with a manually-presettable timer circuit 63 and a pulse generator circuit 64 both of which are connected to all of the said control circuits 62. The purpose of the timer circuit 63 is to inhibit for a predetermined period of time the starting of all the modular power plants 1 controlled from the same central unit 14. The reason for this starting delay is to avoid the simultaneous starting of modular plants 1 controlled from different central units 14 in cases where a number of installations of the FIG. 1 form are connected in parallel to the same electrical power line.

The pulse generator circuit 64 is arranged under certain conditions to intermittently energise warning lamps provided in the control circuits 62, as will be more fully described below.

The monitor circuit 59 includes a voltage comparator 65 which outputs a warning signal when the variations in voltage on the line 15b exceed in absolute terms a predetermined level. A frequency comparator 66 compares the voltage frequency with an internal reference and outputs a warning signal when the frequency variation exceeds a predetermined value relative to this reference. The output of the frequency comparator 66 is connected to the input of a memory circuit 67 which is arranged to store and output any warning signal received from the comparator 66.

The outputs of the comparator 65 and memory circuit 67 are fed to an amplifier 68 which upon receipt of a warning signal from either the comparator 65 or the memory circuit 57, is arranged to output an alarm signal from a first output 68a. This alarm signal is fed to a visual display 69 of the circuit block 60 in order to provide a visual indication of a dangerous variation in the voltage or frequency on the line 15. In the absence of warning signals at the inputs to the amplifier 68 (the absence of such signals being indicative of normal voltage and frequency values on the line 15), the amplifier 68 is arranged to output via a second output 68b, an enabling signal permitting the starting of the modular power plants 1. This enabling signal is fed to an input 70a of a "logical product" circuit 70 included in each of the control circuits 62.

The circuit block 60 for the decoding, storing and visual display of the coded alarm signals includes an optoisolator 71 to the input of which is connected the alarm-data bus 19. The coded alarm signals transmitted along this bus 19 from the modules 13 pass, via the optoisolator 71, to a filter 72. This filter has the function of removing any signal noise superimposed on the alarm signals. The output of the filter 72 is connected to the input of a decoder 73 which analyses the coded signals and identifies the nature of the alarm condition (a failure or abnormal operating condition) represented thereby. Thereafter, the decoder 73 is arranged to output a control signal via a memory circuit 74 to appropriately activate the visual display 69 to indicate the nature of the alarm condition. The memory circuit 74 stores this control signal and continues to apply it to the input of the display 69 until, following removal of the cause of the alarm condition, the memory circuit 74 is reset from an externally operable reset device 75.

The decoder 73 is arranged to cause the visual display 69 to display a different visual indication for each possible alarm condition whether it be due to a failure or an abnormal operating condition. However, this visual display 69 does not give any indication as to from which particular control module 13 the alarm signal originates, and is merely limited to indicating that a certain type of alarm condition has occurred. Other visual indicators which enable the origin of the alarm signal to be identified will be described hereinafter.

As already mentioned, each control circuit 62 is associated with a respective control module 13 and thus also with the corresponding modular power plant 1. Each control circuit 62 includes a pair of push buttons 76 and 77 operable to set into the control circuit 62 the desired state of the corresponding modular plant 1, the push buttons 76 and 77 respectively corresponding to a running state and to a stopped state of the plant 1 and being hereinafter termed the start and stop buttons. As will be explained hereinafter, upon pressing of the start button 76 the corresponding control circuit 62 will not act to start the corresponding power plant 1 if certain unfavourable operating conditions are present but will await the disappearance of these conditions before starting the plant 1; the pressing of a start button 76 thus effectively presets the corresponding power plant 1 for running when the conditions are suitable.

When the start button 76 is pressed a running-state control signal is stored in a memory 78 from where it is continuously fed to an input 70b of the "logical product" circuit 70. This circuit 70, whenever enable signals are present at its inputs 70a, 70c, 70d and 70e, transmits the running-state control signal from the memory 78 to the input of an amplifier 79 whose output is connected to the control bus 17. The bus 17 feeds the amplified control signal to the control module 13 corresponding to control circuit 62 in which the start button 76 has been pressed.

Whenever it is desired to stop a particular modular power plant 1, it is sufficient to press the stop button 77 of the corresponding control circuit 62. By so doing the memory 78 which previously contained the running-state control signal set in from the start button 76 is reset and ceases to provide this control signal to the input 70b of the logical product circuit 70.

Each control circuit 62 further includes an optoisolator 80 the input of which is connected via the data bus 20 to the temperature sensor 11 of the corresponding modular plant 1. This sensor 11 is arranged to output a signal which indicates if the temperature of the fluid leaving the heat exchanger 6 is above or below a predetermined maximum value. Whenever this temperature is below a predetermined maximum value, the optoisolator 80 is arranged to output an enabling signal to the input 70b of the logical product circuit 70 in order to permit the starting of the corresponding modular power plant 1.

Each control circuit 62 has a second optoisolator 81 the input of which is connected via a line 18a and the alarm data bus 18 to the coder circuit 34 included in the corresponding control module 13. As already explained, upon the occurrence of an alarm condition, the coder circuit 34 simultaneously transmits coded alarm signals along the buses 18 and 19; the signal on the bus 19 causing the nature of the alarm condition to be displayed on the visual display 69. The alarm signal transmitted over the bus 18 serves to indentify the sending control module 13 and is passed via the optoisolator 81 to the input of a memory 82. The optoisolator 81 electrically isolates the bus 18 from the subsequent circuitry of the control circuit 62.

The memory 82 stores the alarm signal received over the bus 18 and feeds it continuously via a logical product circuit 83 to the input of an amplifier 84. The amplified signal output from the amplifier 84 is fed as a reset signal to the memory 78 to cancel the running-state control signal held in this memory 78 and thereby bring about the stopping of the corresponding modular power plant 1. The presence of an alarm condition is simultaneously displayed by the flashing of a warning lamp 85 connected to an output of the amplifier 84. This flashing of lamp 85 is brought about by the lamp being intermittently energised by the signal output from the pulse generator 64, this signal being allowed to pass through the logical product circuit 83 when an alarm signal is present at its input 83a.

When continuously lit, the warning lamp 85 serves to indicate that the desired plant operating state set into the control circuit 62 is the running state, this being achieved in the following manner.

After the start button 76 has been pressed, the running-state control signal stored in the memory 78 is applied, not only to the input 70b of the logical product circuit 70, but also to the warning lamp 85 through the amplifier 84. The warning lamp 85 therefore remains continuously lit until the corresponding modular power plant 1 stops either as a result of manual pressing of the stop button 77 or of the occurrence of an alarm condition (which, as already explained, results in the central unit 14 automatically stopping this modular plant).

The warning lamp 85, when extinguished, indicates that the corresponding modular plant 1 is not operating and that no alarm condition exists.

Included in each control circuit 62 is a monostable timer device 86 which provides a logical interlock function between the modular power plants 1. The timer device 86 is arranged to be triggered by the leading edge of the running-state control signal output from the circuit 70 whereby to generate an inhibit pulse of a duration of, for example, 20 seconds. This pulse is arranged to be fed via a line 87 to the input 70e of each circuit 70 from which a running-state control signal is not being output (this conditional feeding of the inhibit pulse to the inputs 70e being controlled in the timer device 86 of each control circuit 62).

In order to start a modular power plant 1, the following signals must be present at the inputs of the logical product circuit 70 of the associated control circuit 62:

(a) the running-state control signal output from the memory 78 as a result of the operation of the start button 76; this signal is applied to input 70b;

(b) an enabling signal originating from the sensor 11 associated with the modular plant 1 which is to be started up; this enabling signal is applied to input 70d;

(c) an enabling signal output from the control circuit 59 to indicate that the electrical parameters (voltage and frequency) of the line 15 are normal; this enabling signal is applied to input 70a;

(d) an enabling signal output from the timer circuit 63 after a predetermined delay, the purpose of this delay being to prevent the simultaneous starting of modular plants 1 controlled from different central units 14 but connected to the same section of electrical line; this enabling signal is applied to input 70c.

In addition, an inhibit pulse must be absent from the input 70e.

When all the previously listed enabling signals are present at the inputs of all the logical product circuits 70, then the modular plant 1 which is first preset for running by means of the start button 76 of the corresponding control circuit, will be first to start. This is so because with all the enabling signals present, the logical product circuit 70 will transmit the running-state control signal without delay to the relevant control module 13 via the amplifier 79 and the control bus 17. Simultaneously, the same control signal triggers the associated timer device 86 which thereupon outputs an inhibit pulse operative to temporarily inhibit the logical product circuits 70 of the control circuits 62 associated with all the other modular plants.

The start-up order of the modular power plants 1 which have been preset for running but have had their circuits 70 temporarily inhibited, will, assuming their circuits 70 are simultaneously enabled, be random in nature and only depend on the response speeds of the circuits 70 and 86. This response speed is determined by the precise component values present in the circuits and due to the tolerances in component values allowed, the response speeds will vary. The chance of the circuits associated with different modular plants having identical response speeds and therefore of these plants starting simultaneously has been found to be so remote, given the large number of the components present and the tolerances involved, as to render unnecessary the use of additional delaying devices for providing different delays for each of the modular plants 1.

On the occurrence of an alarm condition (that is, an abnormal operating condition or a failure), the nature of this condition is shown by the visual display 69, whilst it is possible to identify in which modular plant 1 this condition is experienced simply by observing which of the warning lamps 85 is flashing. When the cause of the abnormal operating condition has been removed or the failure repaired, all the memories of the central unit 14 (that is, memories 67, 74, 78, 82) are reset by operation of the reset device 75.

The central unit 14 is provided with a key 88 the pressing of which serves to test the functioning of either the visual display 69 or of the various warning lights 85.

As has already been mentioned above the d.c. voltages (stabilised and unstabilised) necessary for the operation of all the active circuits included in the central unit 14 are supplied by means of connections (not illustrated) from the power supply circuitry 61. This circuitry 61 includes a rectifier 89 (for example, of the diode bridge type) the input of which is connected to the secondary winding 58c of the transformer 58. The voltage output from this rectifier 89 is smoothed by means of a filter 90. A second rectifier 91 (which, for example, is also of the diode bridge type) is connected on its input side to the secondary winding 58b of the transformer 58. The d.c. voltage output from this rectifier 91 is smoothed by a filter 92 and regulated by means of a voltage stabiliser 93.

The operation of the installation shown in FIGS. 1 to 3 will now be described for the starting up of several modular power plants 1, in conditions in which maximum demand is placed on the electrical distribution line 15 and which best serve to illustrate the working of the installation.

The most demanding operating conditions are experienced in two cases:

(1) in the case where the operator by means of the start buttons 76 simultaneously presets for running several or all of the modular power plants 1, the relevant temperature sensors 11 all indicating thermal conditions appropriate for start up;

(2) in the case where the operator has at different times preset for running more than one modular power plant 1 but the enabling signals from the relevant temperature sensors 11 arrives simultaneously; this situation may occur, for example, due to a temporary deactivation of all the modular power plants 1 as a result of lack of voltage on the line 15, followed by the return of the line voltage after a period long enough for the coolant in each of the engines to have cooled to a temperature sufficiently low that the corresponding sensor 11 outputs an enabling signal to the associated circuit 70.

The modular power plants 1 which are preset for running start in sequence at time intervals determined by timer device 86 included in the control circuit 62 corresponding to each modular plant 1 and, as has already been mentioned, in an order determined by the relative response speed of the circuits 70 and devices 86 of the control circuits associated with the prior plants preset for running but yet to be started. The chances that several plants 1 will start simultaneously, due to equal response speeds in the relevant control circuitry, are virtually nil considered both in practical and statistical terms.

As already described, the start-up of a first one of the modular plants 1 is accompanied by the output from the timer device 86 of the corresponding control circuit 62, of an inhibit signal which is fed to the logical product circuit of the other control circuits 62 to temporarily prevent the starting up of the other modular power plants 1. Upon cessation of this inhibit pulse, the modular power plant 1 which is preset but not yet started, and which has associated therewith the control circuitry with the highest response speed, is next started, all the remaining unstarted plants 1 being again inhibited; this process repeats until the startling of the last modular plant 1 which is preset for running.

The actual starting of each modular plant 1 occurs in the following manner.

Following the presetting for running of a power plant 1 by means of the button 76, a running-state control is stored in the momory 78. This memory 78 feeds the running-state control signal to the input 70b of the logical product circuit 70. If the enabling signals to which reference has already been made are present at the remaining inputs of the logical product circuit 70, this circuit 70 permits the passage of the running-state control signal to the amplifier 79. From here the amplified control signal is transmitted over the control bus 17 to the control module 13 corresponding to the control circuit 62 in which the start button 78 has been preset.

In the control module 13 the control signal from the bus 17 is fed to the amplifier 40 and thence proceeds to energise the contactor 27 which closes to connect the associated three-phase asynchronous machine 4 to the line 15. As a result, the three-phase asynchronous electric machine 4 starts by initially operating as a motor.

The amplifier 40 also feeds the control signal to the timer circuit 52 which, after a period of time sufficient for the asynchronous machine 4 to have reached running conditions, permits both the feeding of fuel to the internal combustion engine 2 coupled to the asynchronous electric machine 4, and the activation of the associated electronic ignition device. As a result, the internal combustion engine 2 starts up, the electric machine 4 operating as a starting motor.

When the running speed of the engine 2 has been reached, the internal combustion engine 2 serves to drive the electric machine 4 in rotation and this machine 4 now operates as a generator supplying electrical power to the electrical line 15.

If, during operation of the installation, abnormal operating conditions or failures occur, or dangerous variations in the electrical parameters of the line 15 are detected, then the various protective and signalling arrangements described above are brought into play.

It should be noted that the various signal buses 17 to 19 can be composed of a plurality of separate lines or can comprise a single line over which data to and from the modules 13 is multiplexed.

We claim:
1. An installation for the combined production of electrical energy and heat, including a plurality of modular power plants each comprising:
   (a) a liquid cooled internal combustion engine with associated ignition and fuel feed devices;
   (b) an asynchronous electric machine drivingly connected to the internal combustion engine and arranged to act as a motor during starting of the internal combustion engine and thereafter as a generator, driven from the engine, for the production of electrical power; and
   (c) heat recovery means including a first fluid circuit around which a first fluid constituted by the engine coolant liquid is arranged to flow, and a heat exchanger having a primary side connected into said first fluid circuit and a secondary side through which a second fluid is arranged to flow to recover, from the engine coolant liquid, heat energy imparted thereto by the internal combustion engine;
said installation further including
a second fluid circuit around which said second fluid is arranged to circulate, the secondary sides of the said power-plant heat exchangers being connected into the second fluid circuit in parallel with each other,
a common electrical energy distribution line to which the said electric machines of the power plants are electrically connectable in parallel, and
a control and protection system including a plurality of control modules each arranged to control a respective one of the said power plants and to output an alarm signal upon the occurrence of any one of a number of alarm conditions corresponding to abnormal operation or failure of the associated power plant, and a central unit connected to each of said control modules to feed control signals thereto and receive alarm signals therefrom; said central unit including;
   control means manually operable to preset for running or to stop a selected one or ones of the modular power plants, said control means being arranged to initiate starting of a said power plant preset for running, by the output of a said control signal to the appropriate control module;
   timer and interlock means operative to ensure that the said modular power plants which have been previously preset for running are started in a sequential manner;
   temperature sensor means arranged to sense for each said power plant the temperature of the second fluid leaving the said heat exchanger thereof;
   inhibit means connected both to the temperature sensor means and to receive said alarm signals from the control modules, said inhibit means being operative to prevent the starting, or to stop the operation, of a said modular power plant when either the corresponding control module outputs a said alarm signal or the corresponding temperature sensed by said sensor means exceeds a predetermined value; and each control module including:

electrical connector means operative in response to a said control signal output from the said control means to interconnect the associated modular power plant and the said common electric energy distribution line whereby to energise the electric machine for operation as a starting motor;

delayed-activation means arranged to activate said ignition and fuel feed devices of the internal combustion engine included in the associated power plant after a predetermined delay relative to the operation of said connector means whereby to permit the electric machine to reach running conditions before the ignition of the internal combustion engine connected thereto;

first measuring means arranged to measure the current supplied by the electric machine when operating as a generator and to output a warning signal when said supplied current is below a first predetermined current value;

second measuring means arranged to measure the inter-winding leakage current of said electric machine, and to output a warning signal when said leakage current exceeds a second predetermined current value;

an output circuit connected to receive said warning signals from said first and second measuring means and operative upon receipt of a said warning signal to output to the inhibit means of the central unit a said alarm signal indicative of the alarm condition giving rise to the warning signal; and timer means arranged to prevent the first measuring means from causing the output circuit to output a said alarm signal during a predetermined period of time immediately following operation of said connector means to effect starting of the electric machine.

2. An installation according to claim 1, wherein the said central unit also includes monitor means arranged to monitor variations in voltage and frequency on said common electrical energy distribution line and to output an inhibit signal when said variations exceed respective predetermined limit values, the said inhibit means being connected to receive said inhibit signal and being operative in response thereto to prevent the starting, or to stop the operation, of all the power plants.

3. An installation according to claim 2, wherein the monitor means includes memory means arranged to store the signals representative of any frequency variation exceeding the corresponding said predetermined limit value, the central unit including manually operable reset means the operation of which is arranged to cancel the contents of said memory means whereby to enable its resetting when the cause of the frequency variation beyond the predetermined limit value has been removed.

4. An installation according to claim 2, wherein the said central unit also includes visual display means connected to said monitor means and operative to provide a visual indication of frequency or voltage variations exceeding said respective predetermined limit values.

5. An installation according to claim 1, wherein each of the said control modules further includes:

protection means operative to automatically disconnect the corresponding modular power plant from the said common electrical energy distribution line upon the occurrence of a short circuit between the windings of the electric machine included in said plant, or upon the electric machine being connected in anti-phase to said common distribution line, and reporting means responsive to operation of said protection means to output a warning signal to said output circuit, the output circuit being arranged upon receipt of said warning signal to transmit a corresponding said alarm signal to the inhibit means of the central unit.

6. An installation according to claim 1, wherein said central unit further includes receiving means connected to receive said alarm signals output from the control modules, an alarm-condition memory means, and reset means manually operable to cancel the contents of the alarm-condition memory means, the receiving means being operative in response to receipt of a said alarm signal to store in said alarm-condition memory means signals indicative of the alarm condition represented by the received alarm signal.

7. An installation according to claim 6, wherein the central unit further includes visual display means connected to an output of the alarm-condition memory means and arranged to provide visual indication of signals stored therein.

8. An installation according to claim 7, wherein the said visual display means includes a visual display arranged to indicate the nature of the alarm condition represented by the stored signals, and a plurality of warning lights each associated with a corresponding control module and arranged to indicate from which control module the alarm signal has been received.

9. A plurality of installations each according to claim 1, said installations being connected in parallel to the same said electrical distribution line and the central unit of the control and protection system of each installation being provided with timer means presettable to stagger the initial moment of connection to the electrical distribution line of modular power plants from different installations.

* * * * *